United States Patent
Gourevitch et al.

(10) Patent No.: US 11,036,341 B1
(45) Date of Patent: Jun. 15, 2021

(54) CONDUCTIVE COMPONENTS IN AN INSULATOR LAYER OF A TOUCH SENSOR STACKUP

(71) Applicant: Apple Inc., Cupertino, CA (US)

(72) Inventors: Alexandre Gourevitch, San Jose, CA (US); Christophe Blondin, Sunnyvale, CA (US); Christopher J. Butler, San Jose, CA (US)

(73) Assignee: Apple inc., Cupertino, CA (US)

( * ) Notice: Subject to any disclaimer, the term of this patent is extended or adjusted under 35 U.S.C. 154(b) by 0 days.

(21) Appl. No.: 16/578,206

(22) Filed: Sep. 20, 2019

Related U.S. Application Data (60) Provisional application No. 62/737,459, filed on Sep. 27, 2018.

(51) Int. Cl.
*G06F 3/044* (2006.01)

(52) U.S. Cl.
CPC .. *G06F 3/0443* (2019.05); *G06F 2203/04111* (2013.01)

(58) Field of Classification Search
None
See application file for complete search history.

(56) References Cited

U.S. PATENT DOCUMENTS

| | | | |
|---|---|---|---|
| 8,537,125 B2 | 9/2013 | Mamba et al. | |
| 8,653,834 B2 | 2/2014 | Reynolds | |
| 10,365,739 B2 * | 7/2019 | Adachi | G06F 3/0446 |
| 10,747,383 B2 * | 8/2020 | Yamai | H01B 13/00 |
| 2006/0278444 A1 | 12/2006 | Binstead | |
| 2009/0213090 A1 * | 8/2009 | Mamba | G06F 3/044 345/174 |
| 2010/0315299 A1 * | 12/2010 | Bibl | H04R 1/1041 343/702 |
| 2014/0152580 A1 * | 6/2014 | Weaver | G06F 3/041 345/173 |
| 2014/0313434 A1 * | 10/2014 | Kim | G06F 3/044 349/12 |
| 2014/0338963 A1 * | 11/2014 | Huang | H05K 3/4644 174/258 |
| 2017/0222059 A1 * | 8/2017 | Chen | H01L 27/124 |
| 2018/0299990 A1 * | 10/2018 | Chiang | G06F 3/0412 |
| 2019/0204955 A1 * | 7/2019 | Haga | G06F 3/0416 |

* cited by examiner

*Primary Examiner* — Sepehr Azari
(74) *Attorney, Agent, or Firm* — Kubota & Basol LLP (57) ABSTRACT

A plurality of metallic components (e.g., conductive rods) can be included within an insulator layer of a touch sensor panel. The metallic components included within the insulator layer can be electrically floating. The metallic components can increase a signal coupling strength across the thickness of the insulator layer. In some examples, the metallic components can have a uniform spacing and uniform physical dimensions. In some examples, the metallic components can provide increased signal coupling in areas directly above touch sensitive regions of underlying touch sensor electrodes. In some examples, the metallic components can pass through the insulator in a straight line that is normal to opposing surfaces of the insulator layer. In some examples, the metallic components can be flared or otherwise pass through the insulator along a path that is not straight and/or not orthogonal to opposing surfaces of the insulator layer.

22 Claims, 9 Drawing Sheets

CONDUCTIVE COMPONENTS IN AN INSULATOR LAYER OF A TOUCH SENSOR STACKUP

CROSS REFERENCE TO RELATED APPLICATIONS

This application claims the benefit under 35 USC 119(e) of U.S. Provisional Patent Application No. 62/737,459, filed Sep. 27, 2018 the content of which is incorporated herein by reference in its entirety for all purposes.

FIELD OF THE DISCLOSURE

This relates generally to touch sensor panels, and more particularly to arrangement of conductive and insulative components in touch layer stackups.

BACKGROUND OF THE DISCLOSURE

Touch sensor panels are a form of input device that can allow a user to interact with an electronic device such as a mobile telephone, digital media player, or portable electronic device. Some touch sensor panel implementations utilize capacitive touch sensors to detect the user's interaction (e.g., by touching or hovering near the touch sensor panel with a finger). Sensitivity and reliability of the touch sensor panel are important factors in accurately translating detected capacitive coupling signals into a desired user input action.

SUMMARY OF THE DISCLOSURE

Examples of the disclosure are directed to arrangements of conductive and insulative materials in touch sensor panels. Some examples of the disclosure are directed to effects of size and density of conductive components within an insulator on sensitivity of an underlying touch sensor.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1A:
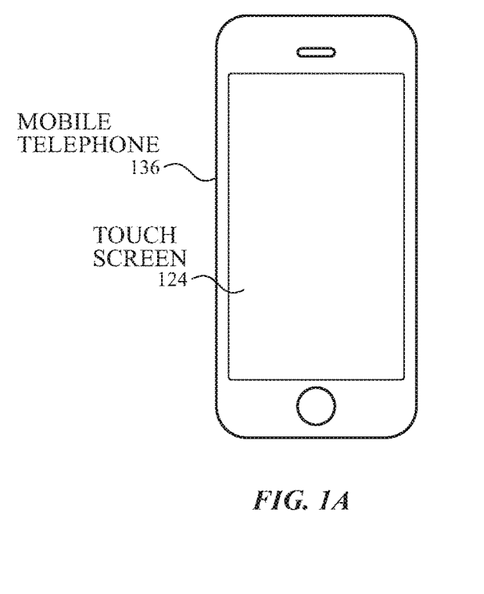
FIGS. 1A-1D show exemplary systems in which a touch screen according to examples of the disclosure may be implemented.
Figure 1B:
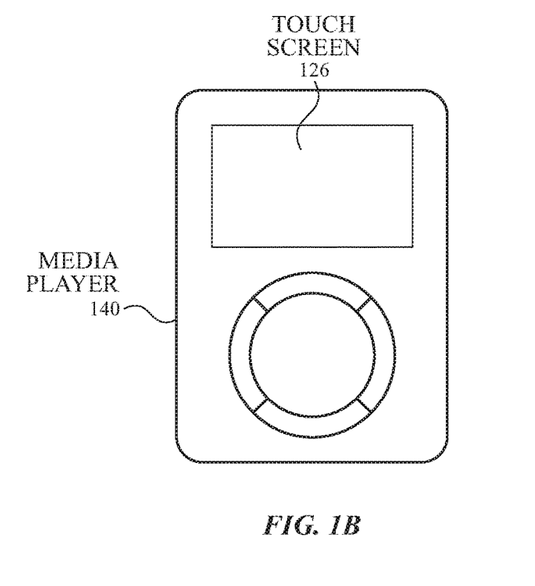
Figure 1C:
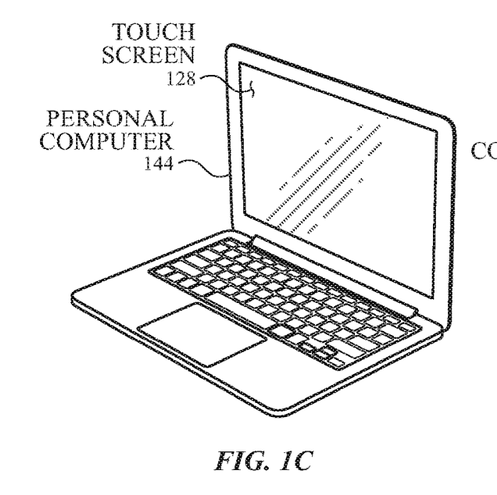
Figure 1D:
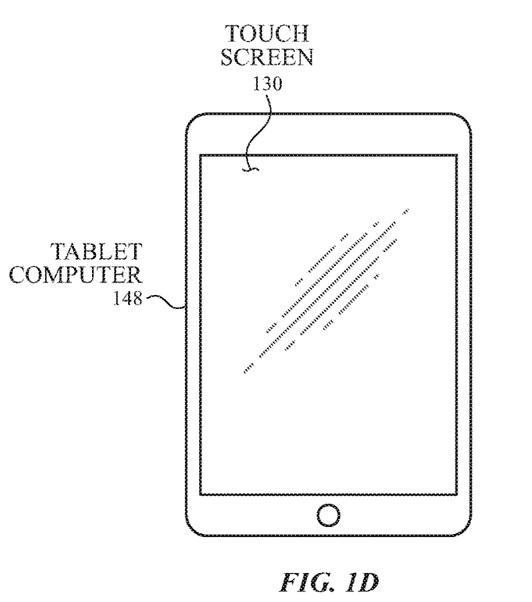

FIGS. 1A-1D show exemplary systems in which a touch screen according to examples of the disclosure may be implemented. The touch screens can include metallic (or other conductive) components, such as metallic or conductive rods, in an otherwise insulating layer to improve touch sensing performance as described herein (e.g., by extending fringing fields from touch electrodes to a top surface of the touch screen stackup). FIG. 1A illustrates an exemplary mobile telephone 136 that includes a touch screen 124. FIG. 1B illustrates an exemplary digital media player 140 that includes a touch screen 126. FIG. 1C illustrates an exemplary portable computing device 144 that includes a touch screen 128. FIG. 1D illustrates an exemplary tablet computing device 148 that includes a touch screen 130. It is understood that a touch screen can be implemented in other devices as well. Additionally it should be understood that although the disclosure herein primarily focuses on touch screens, the disclosure can be implemented for devices including touch sensor panels (and displays) that may not be implemented as touch screens. Additionally, although primarily described herein in terms of metallic components or metal rods, it is understood that the improved touch sensing performance can be achieved more generally using conductive components/conductive rods, that may include other conductive materials (e.g., semiconductors, metal alloys, etc.)

In some examples, touch screens 124, 126, 128 and 130 operate on mutual capacitance or self-capacitance principles. The electrodes can be arranged as a matrix of small, individual plates of conductive material, as drive lines and sense lines, or in another pattern.

Figure 2:
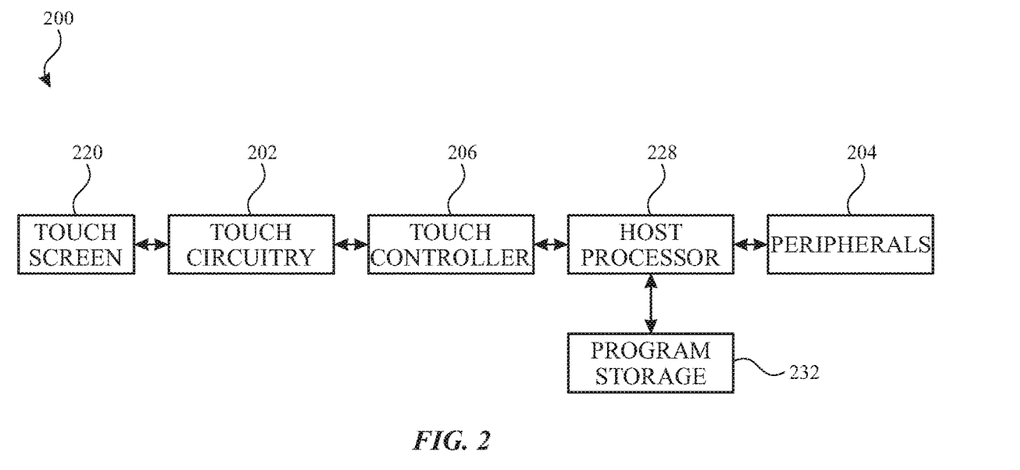
FIG. 2 is a block diagram of an example computing system that illustrates one implementation of an example touch screen according to examples of the disclosure.

FIG. 2 is a block diagram of an example computing system 200 that implements an example touch screen 220 according to examples of the disclosure. Computing system 200 can be included in, for example, mobile telephone 136 (FIG. 1A), digital media player 140 (FIG. 1B), portable computing device 144 (FIG. 1C), tablet computing device 148 (FIG. 1D) or any mobile or non-mobile computing device that includes a touch screen, including a wearable device. Computing system 200 can include a touch sensing system including one or more touch circuitry 202 (e.g. described in more detail with respect to FIGS. 3A-3B), peripherals, and touch controller 206. Peripherals 204 can include, but are not limited to, application-specific integrated circuits, other system components, and the like. Program storage 232 can include, but is not limited to, random access memory (RAM) or other types of memory or storage, and the like. Touch controller 206 can include, but is not limited to, one or more sense channels and channel scan logic. Channel scan logic can provide control for the touch circuitry 206. Components in system 200 can be packaged together in some embodiments. For example, touch controller 206 and touch circuitry 202 can be integrated into a single application specific integrated circuit (ASIC), and in some examples can be integrated with touch screen 220 itself. Touch screen 220 can include a plurality of electrodes coupled to touch circuitry 202 to determine the presence of an object. As described herein, touch screen 220 can include metallic components (e.g., metal rods) in an otherwise insulating layer to improve touch sensing performance.

Figure 3A:
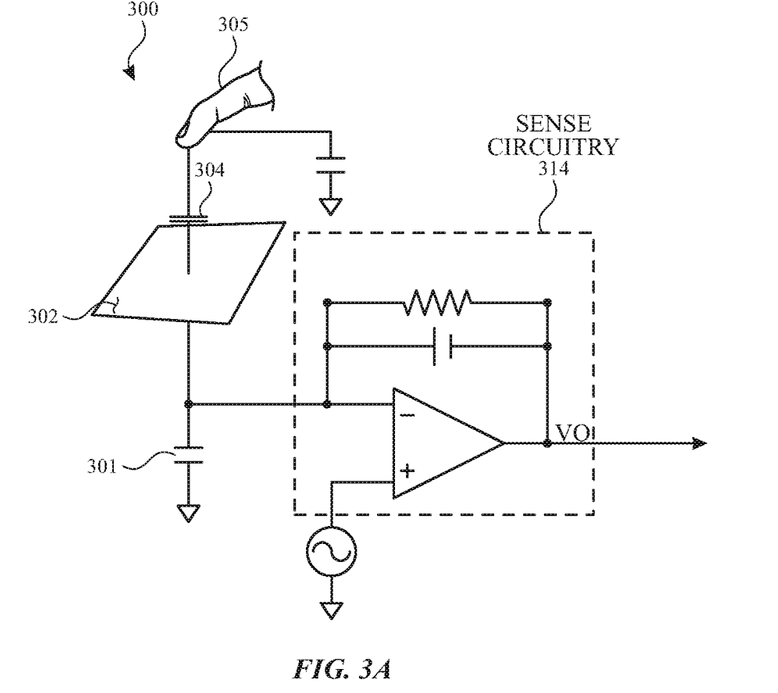
FIG. 3A illustrates an exemplary touch sensor circuit corresponding to a self-capacitance electrode and sensing circuitry according to examples of the disclosure.

FIG. 3A illustrates an exemplary touch sensor circuit 300 corresponding to a self-capacitance electrode 302 and sense circuit 314 according to examples of the disclosure. Touch node electrode 302 can have an inherent self-capacitance 301 to ground associated with it, and also an additional self-capacitance 304 to ground that is formed when an object, such as finger 305, is in proximity to or touching the electrode. In some examples, the self-capacitance 304 to ground can be understood as resulting interaction fringing electric fields emanating from the touch node electrode interacting with the object 305. Sense circuitry 314 (e.g., including an amplifier driven by a stimulation signal and feedback impedance network) can detect changes in the self-capacitance (e.g., increases) associated with the electrode 302 to determine the presence and/or distance of the object 305.

Figure 3B:
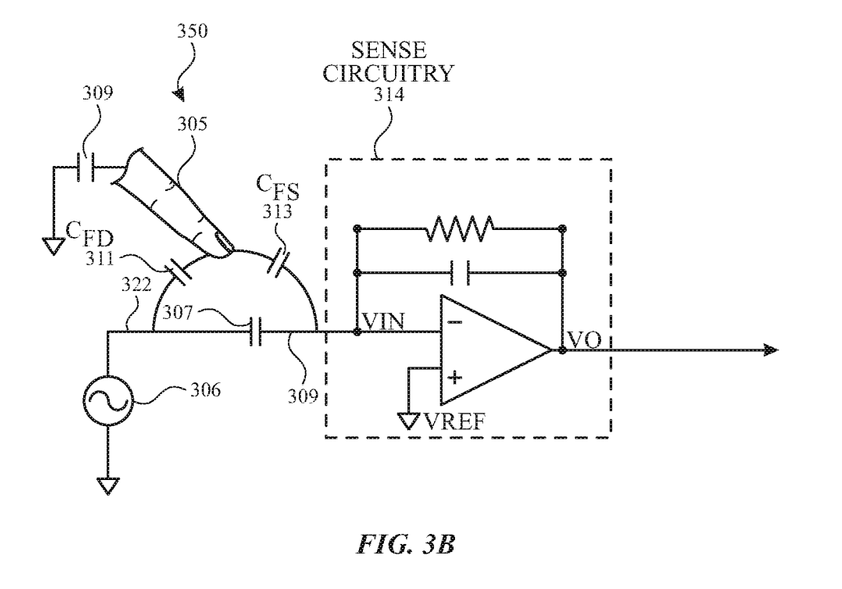
FIG. 3B illustrates an exemplary touch sensor circuit corresponding to a mutual-capacitance configuration according to examples of the disclosure.

FIG. 3B illustrates an exemplary touch sensor circuit 350 corresponding to a mutual-capacitance configuration according to examples of the disclosure. The touch sensor circuit 350 can include a drive electrode 307 and a sense electrode 309. In some examples, the drive electrode 307 can be a drive line, and the sense electrode 309 can be a sense line. Drive electrode 307 can be stimulated by stimulation signal 306 (e.g., an AC voltage signal). Stimulation signal 306 can be capacitively coupled to sense electrode 309 through mutual capacitance 324 between drive electrode 307 and the sense electrode. When an object 305 approaches the touch node created by the capacitive coupling between drive electrode 307 and sense electrode 309, mutual capacitance 324 can be altered as indicated by capacitances 311 and 313. This alteration of the mutual capacitance 324 can be a result of interaction between the object 305 and electric fields emanating from the drive electrode 307 and terminating in the sense electrode 309. This change (e.g., decrease) in mutual capacitance 324 can be detected by the sense circuitry 314 (e.g., including an amplifier and feedback impedance network) to indicate a touch or proximity event.

Figure 4A:
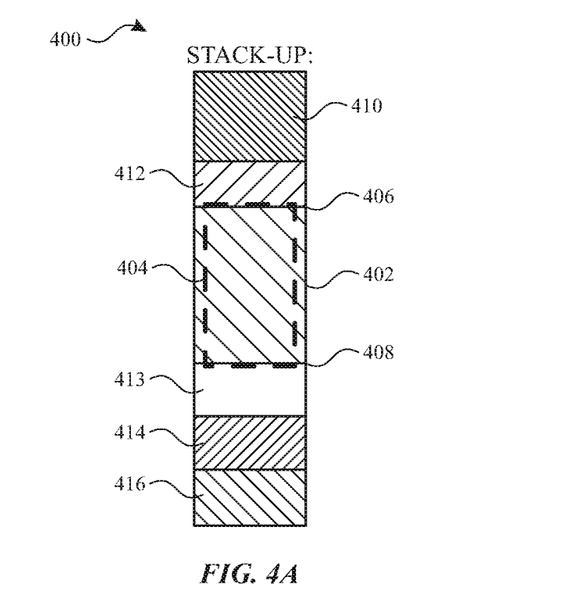
FIGS. 4A-4C illustrate exemplary touch screen stack-ups including according to examples of the disclosure.

FIG. 4A illustrates an exemplary electronic device touch layer stackup 400 including an insulator layer 402 with metallic components 404 (conductive components) distributed between a top (e.g., first) surface 406 and bottom (e.g., second) surface 408 of insulator layer 402. A cover substrate 410 is adhered using optically clear adhesive 412 to top surface 406 of insulator layer 402. Touch layer 413 is disposed adjacent (e.g., abuts) bottom surface 408 of the insulator layer 402 (including metallic components 404). Display layer 416 resides on the other side of touch layer 413 away from bottom surface 408 using exemplary adhesive layer 414. Touch layer 413 includes, for example, touch electrodes that detect touch objects using capacitive or other sensing principles, such as the configurations described above in FIGS. 2-3 above and below in FIGS. 8A, 8B, 9, and 10. In some examples, cover substrate is glass (or sapphire crystal or other suitable material) and provides a protective outermost layer in stackup 400 that can be touched by a user of an electronic device incorporating exemplary stackup 400 (e.g., by a touch object such as a finger or stylus). In some examples metallic components 404 are metal rods.

One of skill in the art would appreciate that other configurations are possible. For example, adhesive layers may be used to in between the various layers of stackup 400. For example, insulator layer 402 can be coupled by adhesive layer 414 to display layer 416. As another example, insulator layer 402 can be coupled by an adhesive layer (not illustrated) to touch sensing layer 413. The stackup optionally comprises a polarizer coupled between the insulator layer 402 and the display layer 416 (e.g., as part of an adhesive layer). In some examples, the touch sensor layer 413 can be disposed directly on the display layer (e.g., instead of being disposed on the bottom surface 408 of the insulator layer 402) or the touch sensor layer 413 can be integrated with circuitry the display layer (e.g., with common electrodes used for both touch sensing and display functionality).

Figure 4B:
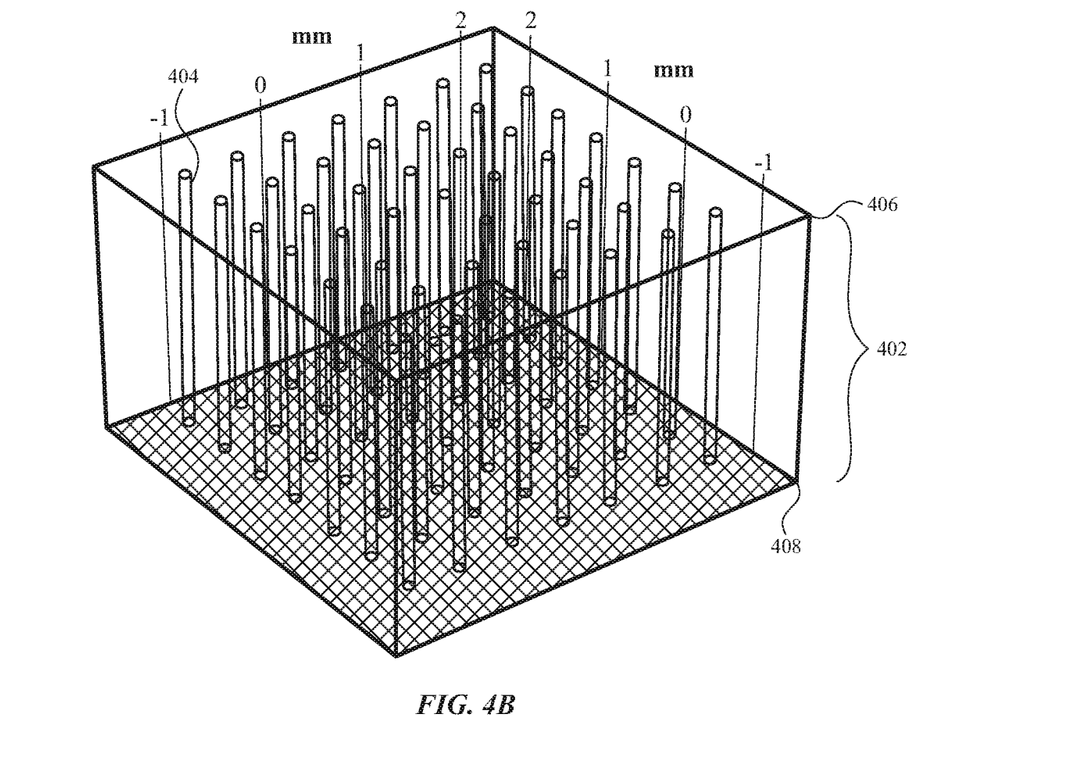

FIG. 4B illustrates a perspective view of exemplary insulator layer 402 showing one exemplary distribution of the metallic components (e.g., metal rods 404) within the insulator layer. In some examples, the metal rods 404 comprise transparent or at least translucent conductive material disposed within the insulator layer. In some examples, metal rods 404 are made of non-transparent material but are sufficiently thin and sparse to appear transparent to the eye. In some examples, metal rods 404 are electrically floating and span from the bottom surface 408 to the top surface 406 of the insulator layer 402. In some examples, floating metal rods 404 do not span across the entirety of insulator layer 404 from top surface 406 to bottom surface 408. In some examples, the metal rods 404 can be inserted into the insulator layer 402 by drilling holes through the insulator layer and filling the through holes with a conductive material. In some examples, bundled fibers can be used to form the insulator layer 402 as will be described in more detail below with regard to FIGS. 11 and 12.

In some examples, the metal rods 404 can behave as high conductivity tunnels for electrical potential between the bottom surface 408 and the top surface 406 of the insulator layer 402. It can be understood that the conductive rods can allow the potential at the two ends of a respective rod to be approximately equal. In some examples, these metal rods 404 can extend electric field lines that can emanate from electrodes in a touch sensor (e.g., in touch layer 413). In some examples, this extension of the electric field lines through the metal rods 404 can allow an increase proportion of electric field lines from the touch sensor electrodes to reach the through the thickness of the insulator layer 402 toward a touch object on the cover substrate (e.g., cover glass 410). By placing rods across insulator layer 402, the tunneling effect for electrical potential can occur across the entire surface of a touch sensitive device, thereby improving the reliability of the touch sensitive device in that the impacts of a touch object are more reliably sensed by touch sensing layer 413.

In the illustrated configuration in FIG. 4B, the metal rods 404 are shown each having a uniform diameter, uniform center-to-center spacing, and a uniform shape (e.g., cylindrical rods). In some examples, since a non-transparent conductor may be used to form the metal rods 404, a uniform size and distribution of rods can have an advantage of visual uniformity. It should be understood that although a uniform diameter (or more generally, uniform physical dimensions, e.g., uniform volume), uniform center-to-center spacing, and uniform shape for metal rods 404 is shown in FIG. 4B, each of these characteristics can be varied without departing from the scope of the present disclosure. FIGS. 8B and 10A-10C below illustrate exemplary non-uniform metal rod 404 configurations in further detail. It should be understood that while the phrase uniform is used in the present disclosure to describe characteristics of the metal rods (e.g., dimensions, distributions, shapes, or the like) that some minor variations due to manufacturing tolerances in any of the metal rod characteristics can be present without rendering a particular characteristic to be non-uniform.

Figure 4C:
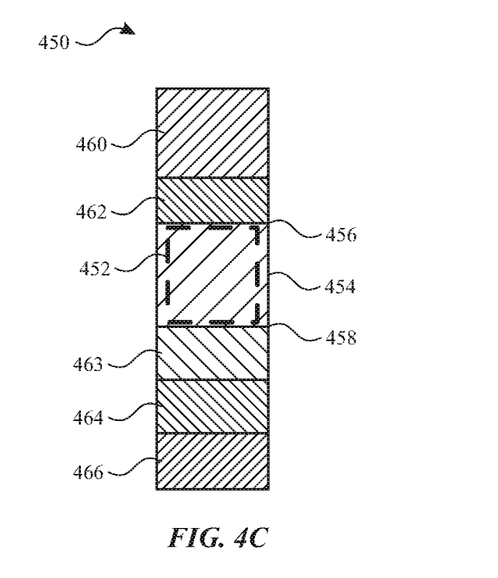

Although primarily described herein as an insulator layer including metallic components (e.g., metal rods), in some examples, a stackup may include a conductive layer including insulative components. FIG. 4C illustrates an exemplary electronic device touch layer stackup 450 including a conductive layer 454 with insulative components 452 distributed between a top (e.g., first) surface 456 and bottom (e.g., second) surface 458 of conductive layer 454. A cover substrate 460 is adhered using optically clear adhesive 462 to top surface 456 of conductive layer 454. Touch layer 463 is disposed adjacent (e.g., abuts) bottom surface 456 of conductive layer and insulative component 452. Display layer 466 resides on the other side of touch layer 463 away from bottom surface 458 using exemplary adhesive layer 464. Touch layer 463 includes, for example, touch electrodes that detect touch objects using capacitive or other sensing principles, such as the configurations described above in FIGS. 2-3 above and below in FIGS. 8A, 8B, 9, and 10. In some examples, cover substrate 460 is glass and provides a protective outermost layer in stackup 450 that can be touched by a user of an electronic device incorporating exemplary stackup 450. In some examples insulative components 452 are openings (e.g., holes) in conductive layer 454. In some examples such openings are filled (e.g., via injection molding) with a dielectric or other insulating material (e.g., epoxy). In most general terms, the stackups described herein can include an intermediate layer between a cover substrate (e.g., cover substrate 410, 460) and touch electrodes (e.g., in touch layer 413, 463) that includes both conductive and insulative components.

Figure 5:
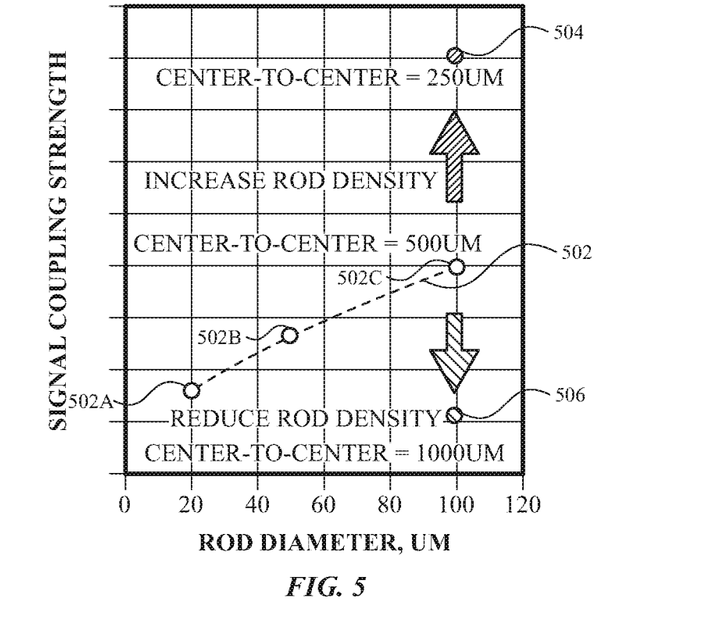
FIG. 5 illustrates an exemplary plot of signal coupling strength with variations of metallic component density and sizing according to examples of the disclosure.

FIG. 5 illustrates an exemplary plot of signal coupling strength with variations of metal rod density and metal rod diameter according to examples of the disclosure. In the illustrated example, the dashed curve 502 can represent a plot of uniformly spaced metal rods (e.g., metal rods 404 in FIG. 4B) at a center-to-center distance of 500 microns. For the purposes of the illustrated chart, the shape of all of the rods is assumed to be a uniform through the entire thickness of the insulator (e.g., insulation layer 402) above. The horizontal axis of the chart in FIG. 5 corresponds to diameter of metal rods measured in microns. The vertical axis of FIG. 5 can correspond to a signal coupling strength between a top surface and bottom surface of an insulator layer (e.g., 402 above in FIGS. 4A-4B). The vertical axis of FIG. 5 can be a capacitance value of touch signal capacitances (e.g., self-capacitance C 304 in FIG. 3A or 311 and 313 in FIG. 3B). In some examples, the dashed curve 502 can represent signal coupling strength values for three different rod diameters (e.g., at points 502a, 502b, and 502c) with a uniform center-to-center distance between adjacent rods at a uniform spacing of 500 microns. As can be seen by the shape of the curve 502 as rod diameter is increased, signal coupling strength can also be correspondingly increased. It should be understood that while diameter is used to describe the physical dimension of rods in the plot of FIG. 5, that more generally, an increase in the physical dimensions of a rod (e.g., width, area) can correspondingly increase signal coupling strength. Furthermore, for a fixed thickness of the insulator, an increase in dimensions (e.g., diameter, width, area) can be generalized as an increase of volume of the metal rods. The points 504 and 506 each represent, respectively, a value for 100 micron rod diameter (e.g., corresponding to point 502c) where center-to-center distance is changed to 250 microns and 1000 microns, respectively. As can be seen in the illustration, a reduction in the rod density (e.g., a larger center-to-center distance) can lower signal coupling strength and an increase in the rod density (e.g., a smaller center-to-center distance) can increase signal coupling strength. While the illustrated plotted points in FIG. 5 can result from uniformly distributed metal rods (e.g., 404 in FIG. 4B above), the relationships between signal strength and dimensions/spacing of metal rods can also be applied to non-uniform distributions of metal rods.

Figure 6:
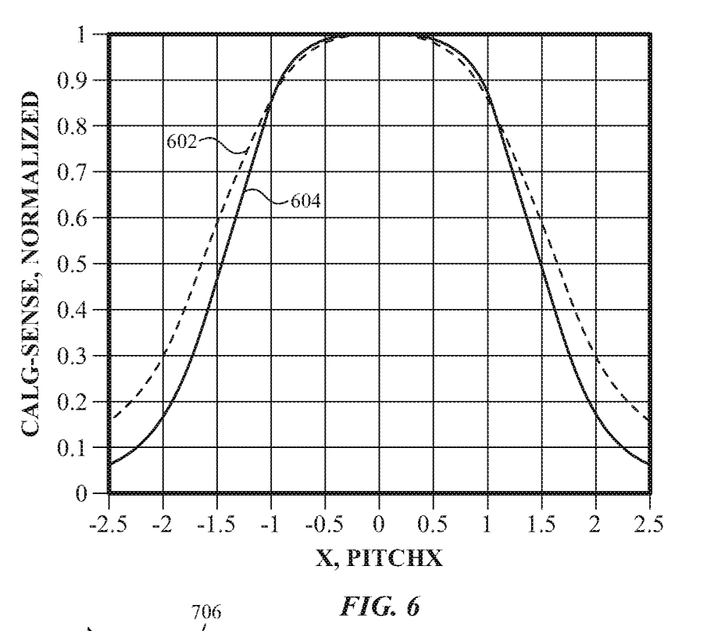
FIG. 6 illustrates signal sensing profiles for an insulator layer with and without metallic components according to examples of the disclosure.

FIG. 6 illustrates signal sensing profiles for an insulator layer with and without metallic conductors (e.g., metal rods) according to examples of the disclosure. Specifically, FIG. 6 is a chart illustrating an effect of inclusion of metal rods in an insulator layer on measurement profile for a single sense node of a touch sensor according to examples of the disclosure. In the illustrated chart, the horizontal x-axis represents a position of an object (e.g., a finger) along a line that passes through the center of a single touch sensor electrode. The scale of the horizontal x-axis is represented by a pitch distance between adjacent sense nodes in a touch sensor panel that includes the single sense node. The signal value at x=0 can correspond to a signal sensed at the single sense node when an object is positioned exactly above the center of the single sense node. As may be expected, the single sense node can produce a maximum signal output when the object is positioned exactly above the center of the single sense node. The y-axis values in the illustrated chart of FIG. 6 can represent the output signal of the single sense node for any particular object position=x in relation to the center of the single sense node (x=0). One effect of an insulator layer can be a relatively flat signal profile 602 as measured by a single sense node as a proximate object position moves away from the center of the single sense node. In some examples, a flattened signal profile 602 can reduce performance of detecting object position (reduced accuracy/precision). For example, a centroid algorithm for detecting object position can be used to determine an object position based on sensed touch and/or proximity at multiple sensor electrodes of a touch sensor panel. In some examples, if the sensing profile for each sensor is flat, the centroid algorithm may not be able to detect object position with a high resolution. In another example, a relatively flat signal profile can result in an inability to distinguish between a simultaneous touch with multiple fingers (e.g., multi-touch) and a single touch by a large finger or other touch object. The addition of metal rods (e.g., metal rods 404 in FIG. 4B above) into the insulator layer can tighten the signal profile as shown by curve 604. The tightening of the signal profile can occur as a result of the fringing electrical field lines emanating from and/or terminating at the single sense node having a more direct path through the metal rods from one side of the insulator layer to the opposite side of the insulator layer. In the absence of the direct path provided by the metal rods, the fringing electrical fields can have a wider spread resulting in the flat signal profile 602. In some examples, the signal profile can be modified by adjusting dimensions, shape, and/or spacing of the metal rods in the insulator layer. In some examples, the metal rods can be uniform in shape, dimensions, and/or spacing across an entire touch sensor panel. In some examples, one or more of shape, dimensions, and/or spacing of the metal rods can be varied to achieve a desired signal profile.

Figure 7:
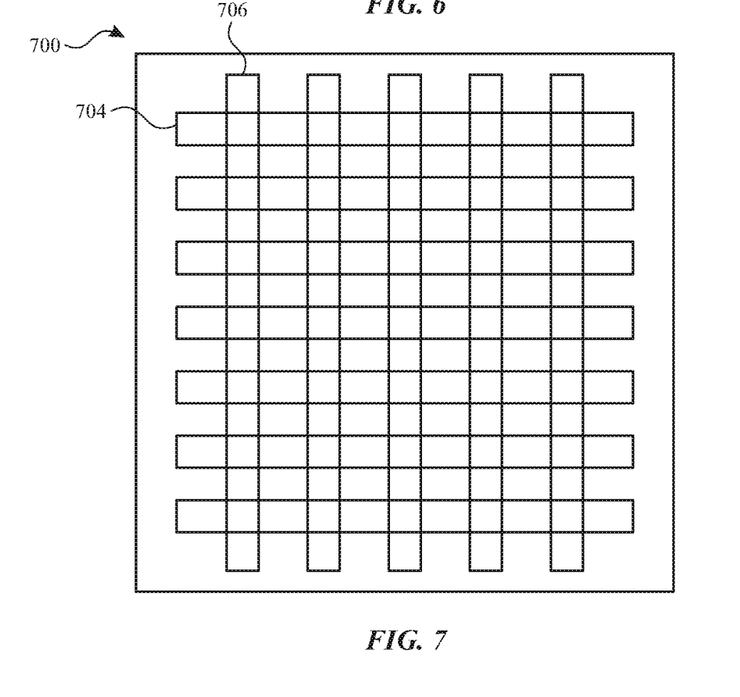
FIG. 7 illustrates a touch screen with sense lines arranged in rows and drive lines arranged in columns according to examples of the disclosure.

FIG. 7 illustrates touch screen 700 with drive lines 706 and sense lines 704 arranged in rows and columns, respectively, according to examples of the disclosure. In some examples, sense lines can be arranged in columns and drive lines can be arranged in rows. Specifically, touch screen 700 can include one or more touch electrodes disposed as columns that form drive lines (e.g., single contiguous electrodes, or noncontiguous electrodes electrically coupled together using electrical bridges), and one or more touch electrodes disposed as rows that form sense lines (e.g., single contiguous electrodes, or noncontiguous electrodes electrically coupled together using electrical bridges). The touch electrodes can be on the same or different material layers on touch screen 700, and the drive lines 706 and the sense lines 704 and can intersect with each other while remaining electrically isolated from each other, as illustrated in FIG. 7. In some examples, touch screen 700 can sense the self-capacitance of lines 704 and 706 to detect touch and/or proximity activity on touch screen 700, and in some examples, touch screen 700 can sense the mutual capacitance between lines 704 and 706 to detect touch and/or proximity activity on touch screen 700. In some examples, touch screen 700 can sense both the self-capacitance of lines 704 and 706 and the mutual capacitance between lines 704 and 706 to detect touch and/or proximity activity on touch screen 700.

Figure 8A:
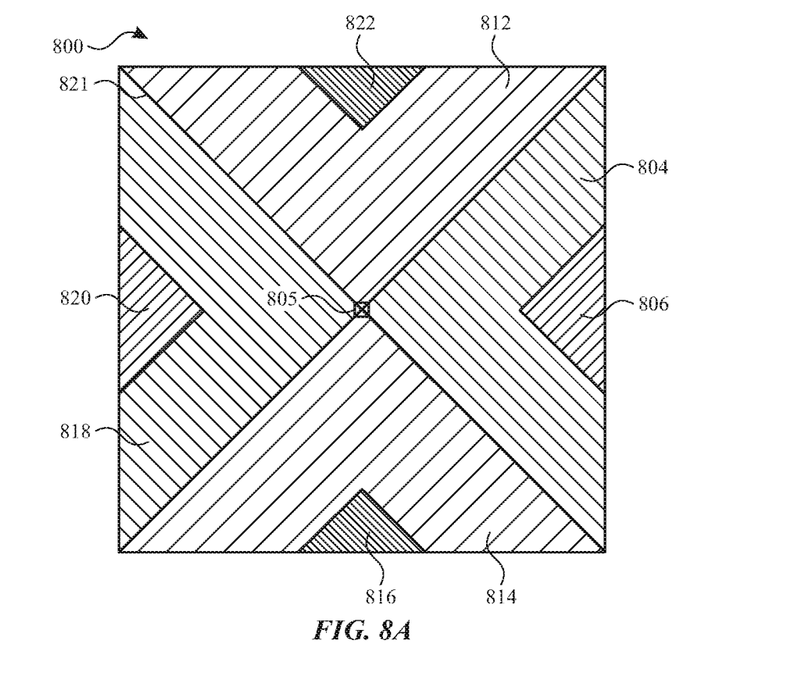
FIGS. 8A-8B illustrate an exemplary touch node and non-uniform metallic component distributions in an insulator layer according to examples of the disclosure.

FIG. 8A illustrates an exemplary square touch node design according to examples of the disclosure. Specifically, in configuration 800 of FIG. 8A, a square touch node can be composed of drive electrodes 812 and 814, sense electrodes 804 and 818, floating electrodes 806 and 820 and ground electrodes 816 and 822. The square touch node design can be repeated such that drive lines can be formed of diamond shaped drive electrodes and sense lines can be formed of diamond shaped sense electrodes. For example, a square touch node of configuration 700 can be placed at the top/bottom/left/right of another square touch pixel of configuration 700.

In some examples, drive electrodes share boundaries with sense electrodes, ground electrodes, and/or floating electrodes. Similarly, in some examples, sense electrodes share boundaries with drive electrodes, ground and/or floating electrodes. In some examples, the center of the drive electrodes and the sense electrodes can be at the geometric center of the square touch node. For example, in FIG. 8A, the intersection point of the drive electrodes 812 and 814 and the sense electrodes 804 and 818 can be at location 805, which is optionally also the geometric center of the square touch node. In some examples, there can be a symmetrical distribution of sense, drive, ground and/or floating electrodes in a touch node. For example, in FIG. 8A, the square touch node can be composed of symmetrical drive electrodes 812 and 814, sense electrodes 804 and 818, floating electrodes 806 and 820 and ground electrodes 816 and 822. In some examples, the area of the symmetrical sense electrodes of the square touch node can be kept close to each other (e.g., within a threshold amount) by including floating or ground electrodes of the same size in both the similarly sized sense electrodes. For example, in FIG. 8A, the square touch node may include floating electrode 806 within sense electrode 804 and floating electrode 820 of the same size as the floating electrode 806 within sense electrode 818 to keep the areas of sense electrodes 804 and 818 close to each other (within a threshold distance) to achieve linearity of touch sensing.

Each touch node can be composed of one or more drive electrodes, one or more sense electrodes, one or more ground electrodes and/or one or more floating electrodes. Specifically, sense electrodes of the touch nodes disposed as rows can be connected together to form sense lines (e.g., single contiguous electrodes, or noncontiguous electrodes electrically coupled together using electrical bridges), similar to sense lines 704 shown in FIG. 7. In some examples, drive electrodes of the touch pixels disposed as columns can be connected together to form drive lines (e.g., single contiguous electrodes, or noncontiguous electrodes electrically coupled together using electrical bridges), similar to drive lines 706 shown in FIG. 7. In some examples, a sense line 704 (or sense electrode 309 as referenced in FIG. 3B) can be tied to sense circuitry as shown in FIG. 3B. In some examples, a drive line 706 (or drive electrode 307 as referenced in FIG. 3B) can be tied to drive circuitry as shown in FIG. 3B. In some examples, floating electrodes can be kept floating (e.g., at high impedance, or uncoupled from any voltage source). In some examples, ground electrodes can be coupled to an outside reference voltage such as ground (or a DC voltage) thereby grounding all the connected ground electrodes.

As is understood from the description above in FIGS. 4A-4B, 5, and 6, the addition of metal rods (e.g., metal rods 404 above) within an insulator (e.g., 402 above) can increase coupling between the touch sensor electrodes on a touch sensor panel an object proximate to or touching a cover substrate (e.g., cover glass 410). As explained above, an increase in coupling provided by the inclusion of metal rods in the insulator layer can increase sensitivity of touch sensing as well as producing a touch sensing profile shape that can improve accuracy of touch detection algorithms (e.g., centroid, multi-touch detection, etc.) as compared with an insulator layer without metal rods. However, in some examples, a uniform distribution of metal rods in the insulator layer can also increase unwanted coupling with the touch sensor electrodes. For example, if additional charge (e.g., from an ungrounded object, or floating liquid or dirt) is injected into a sense electrode, the additional charge result in an erroneous measurement. In some example, the erroneous measurement can be a detection of an object that is not actually present (e.g., a false positive). In some examples, the erroneous measurement can be a failure to detect an object that is present due to a destructive interference with the sensing signal caused by an object that is actually present proximate to the touch sensor panel (e.g., a false negative). Thus, although increasing coupling can be beneficial to detecting a touch object, doing so uniformly across a touch panel can also increase coupling that interferes with proper touch object detection. Accordingly, it can be desirable to provide a non-uniform distribution of metallic conductors (e.g., metal rods) in the insulator layer to increase coupling to a greater degree in areas where the touch sensor electrodes are sensitive to proximate objects and to increase coupling to a lesser degree in areas where the touch sensor electrodes are less sensitive to proximate objects but still susceptible to erroneous signals that can interfere with object position measurement. The examples presented below with regard to FIGS. 8B and 10A-10C illustrate non-uniform distributions of metal rods in an insulator layer according to examples of the disclosure.

Figure 8B:
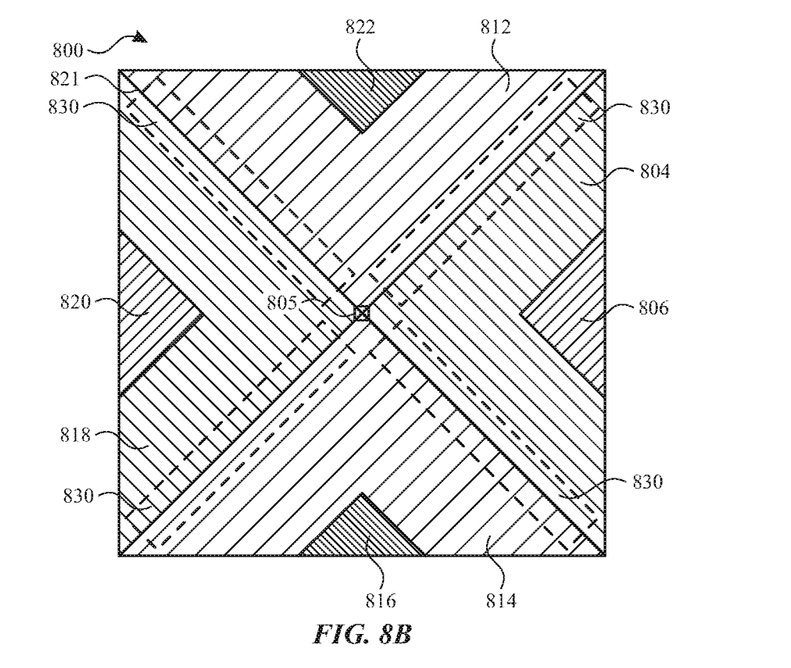

FIG. 8B illustrates an exemplary non-uniform metal rod distribution that can be used in connection with the exemplary touch node arrangement described in FIG. 8A according to examples of the disclosure. In FIG. 8B, the regions 830 represent boundaries between drive electrodes 812 and 814 and sense electrodes 804 and 818. For example, the boundary between drive electrode 812 and sense electrode 818 is highlighted at the position 821. In some examples, a mutual capacitance that can be used for proximity detection can be formed at each of the boundaries between drive electrodes 812 and 814 and sense electrodes 804 and 818 (e.g., the fringing field lines between drive electrodes and sense electrodes can be strongest at the boundaries between drive and sense electrodes). As should be understood from the description in FIG. 3B above, object position detection based on these mutual capacitances relies on interaction between an object and the mutual capacitance (e.g., as described above in FIG. 3B). Accordingly, it can be desirable to increase the signal coupling to the touch sensor by extending these fringing fields between the drive electrodes and sense electrodes through to the cover substrate over the electronic device in the regions 830. With such an approach, the signal coupling to the touch sensor can be increased most strongly in areas where touch sensing actually occurs in the touch sensor panel. In other areas, such as the portion of the sense electrodes 818 and 804 between the regions 830 and the floating electrodes 820 and 806, respectively, a relatively lower amount of coupling (e.g., by using a reduced density or size of conductive rods) may be preferred to reduce electrical signals that are not the result of object proximity from coupling with the sense electrodes. For example, as mentioned above, charge injected by ungrounded objects into a sense electrode can result in an erroneous measurement (e.g., a negative pixel, false positive, or false negative), and accordingly a relatively reduced signal coupling strength (e.g., as compared to the regions 830) may be preferable above the sense electrodes 818 and 804 outside of the boundary regions 830 (e.g., by reducing the extension of fringing fields through to the cover substrate in these regions).

In some examples, to the extent that the drive electrodes 812 and 814 are not used for signal measurement (e.g., in a mutual capacitance sensing arrangement), the area of the drive electrodes 812 and 814 outside of the boundary regions 830 (which also may be referred to herein as border regions) can benefit from having a relatively high signal coupling strength. In some examples, the area of the drive electrodes 812 and 814 outside of the boundary regions 830 can have the same signal coupling strength as the region 830 (e.g., by using the same density or size of conductive rods). In some examples, the area of the drive electrodes can have a signal coupling strength lower than the signal coupling strength in the regions 830, but higher than the signal coupling strength in the area above the sense electrodes 818 and 804 and outside of the boundary regions 830 (e.g., the density and/or size of the conductive rods can be greater in boundary regions 830 than over sense electrodes outside boundary regions 830, and the density and/or size of the conductive rods can be greater over sense electrodes outside boundary regions 830 than over drive electrodes outside boundary regions 830). In some examples, the areas above the ground electrodes 816 and 822 and the floating electrodes 806 and 820 can have very few or even no metal rods in the insulator layer and as a result have a significantly lower signal coupling strength compared to the boundary regions 830 and the areas above the sense electrodes 818 and 804 and the drive electrodes 812 and 814.

It should be understood that in addition to the signal strength considerations for different regions of touch sensor electrodes have been described with relation to the specific configuration in FIG. 8B, similar considerations can also be made for other physical configurations of touch sensor electrodes without departing from the scope of the present disclosure. Furthermore, although signal coupling strength was primarily discussed immediately above, it should be recognized from the disclosure (e.g., FIG. 6 above) that different shapes, sizes, and densities of metal rods in the different regions of insulator layer above the touch sensor panel can also be used to tailor the signal sensing profile of the touch sensor electrodes.

In some examples, the increased signal coupling strength in boundary regions 830 can be attained by increasing metal rod diameter (e.g., moving to the right on the curve 502 in FIG. 5). In some examples, the increased signal coupling strength in boundary regions 830 can be attained by increasing the density of metal rods in boundary regions 830. For example, the density can be increased by decreasing the center-to-center spacing of the metal rods (e.g., by shifting curve 502 up as illustrated by point 504 in FIG. 5). In some examples, a combination in change of rod diameter and rod density can be used to attain the increased signal coupling in boundary regions 830. In some examples, the rod diameter and center-to-center spacing in the entire boundary regions 830 can be uniform and change abruptly relative to neighboring regions. In some examples, a gradient can be used to transition rod diameter, center-to-center spacing, or both rather than an abrupt change between desired signal coupling strength in boundary regions 830 to the desired signal coupling strength outside boundary regions 830. It should be understood that the same principles for controlling signal coupling strength described immediately above regarding the boundary regions 830 can also be applied to other regions of the touch sensor electrodes such as the regions above outside of the boundary regions 830 above the sense electrodes 818 and 804, the area outside of the boundary regions above the drive electrodes 814 and 814, the areas above the floating electrodes 822 and 816, and the areas above the ground electrodes 806 and 820.

Figure 9:
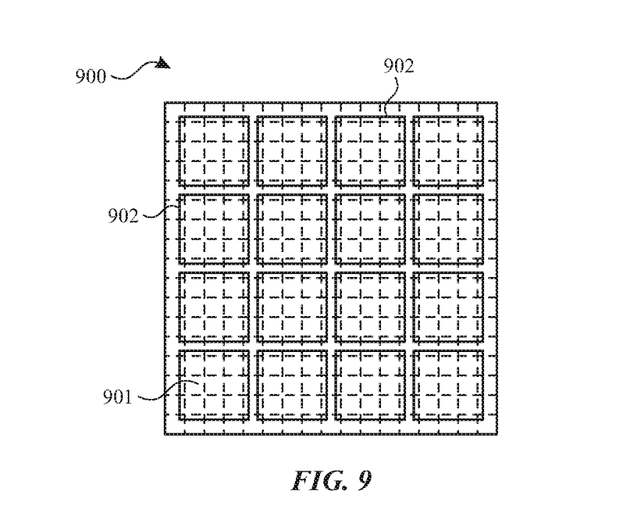
FIG. 9 illustrates an exemplary pixelated touch sensor configuration according to examples of the disclosure.

FIG. 9 illustrates an exemplary pixelated touch sensor 900 according to examples of the disclosure. In some examples, the pixelated touch sensor 900 can be disposed on a bottom (e.g., second) surface of an insulator layer (e.g., corresponding to insulator layer 402 in display stackup 400). Each of the electrodes 902 can operate as touch sensing electrodes of a touch sensor. In some examples, each of the electrodes 902 can be connected to a sensing circuit (e.g., 314) corresponding to a self-capacitance measurement sensor as described above with regard to FIG. 3A. For example, each of the sixteen electrodes 902 illustrated in FIG. 9 can be connected to a corresponding one of sixteen sensing circuits to measure self-capacitance to measure self-capacitance in one scan step. In some examples, switching circuitry can be used to couple the electrodes to a smaller number of sensing circuits to measure self-capacitance of the electrodes in multiple scan steps (e.g., 4 scan steps to measure 16 electrodes with 4 sensing circuits). In some examples, the change (e.g., increase) in total self-capacitance of each electrode 902 can depend on the proximity of an object, such as a finger, to the respective electrode. In some examples, when operated in the self-capacitance mode, the electrodes 902 can project fringing fields as described above. In some examples where an insulator layer (e.g., insulator layer 402) is present in the stackup between the electrodes 902 and a cover substrate layer (e.g., cover glass 410), the large distance of a touch object from the electrodes can flatten the signal profile (e.g., as described above in FIG. 6) and make distinguishing the position of an object more difficult. In some examples, the inclusion of metal rods can provide a conductive path (e.g., a potential tunnel) for the fringing fields through the insulator layer.

Figure 10A:
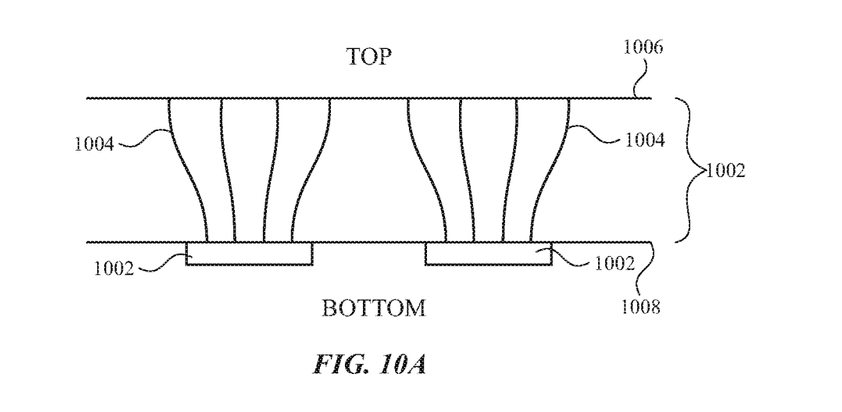
FIGS. 10A-10C illustrate an exemplary metallic component configuration using flared metallic components in an insulator layer according to examples of the disclosure.

Referring back to FIG. 4B, the metallic components 404 (e.g., metal rods) can have a cylindrical shape (or other shape) and can be oriented normal to the top surface 406 and bottom surface 408. In some examples, the metal rods can have a non-linear orientation. FIG. 10A illustrates a side view of exemplary flared conductive metal rods 1004 disposed within an insulator layer 1006 according to examples of the disclosure. Electrodes 1002 (which can correspond to electrodes 902 in FIG. 9) are illustrated on being disposed on a second, bottom surface 1008 (e.g., corresponding to bottom surface 408 above) of the insulator layer 1006. In the exemplary flared configuration of the metal rods 1004 illustrated in FIG. 10A, the bottom portion of the rods near each electrode 1002 can be concentrated toward a center portion of each electrode. At the same time, flaring of the conductive metal rods 1004 can allow for a more widely distributed positioning of the metal rods at the first, top surface 1006 (e.g., corresponding to top surface 406 above). In other words, the flaring results in relatively reduced inter-rod spacing near the second, bottom surface 1008 compared with the relatively increased inter-rod spacing near the first, top surface 1006. One result of the flared metal rods 1004 as illustrated in FIG. 10A is that electric field lines (fringing fields) can be concentrated toward the active area of the electrodes 1002. This redirection of the electric field lines can concentrate the field lines onto a particular nearest electrode and narrow the measurement profile associated with each electrode (e.g., as illustrated in FIG. 8 above).

Figure 10B:
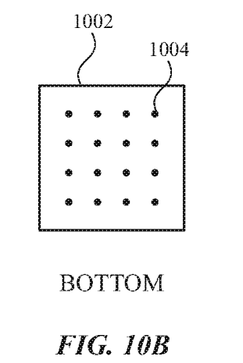
Figure 10C:
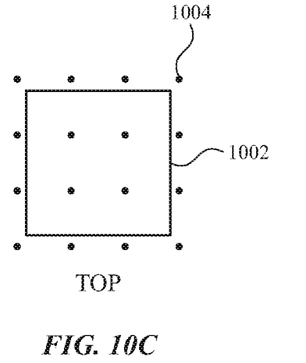

FIGS. 10B and 10C illustrates top down views of the exemplary conductive metal rod configuration in FIG. 10A at the bottom surface 1008 of the insulator layer 1002 and the top surface 1006 of the insulator layer 1002, respectively. As illustrated in FIG. 10A, the rods can flare from the bottom layer to the top layer in a two dimensional pattern. As shown in FIG. 10B, all of the metal rods 1004 can be bounded by the electrode 1002 at the bottom surface 1008 of the insulator layer. As a result of the flare illustrated in FIG. 10A, the metal rod 1004 pattern at the top surface 1006 of the insulator layer 1002 can be spread out such that some of the metal rods 1004 at the top surface 1006 are outside the boundaries of the electrode 1002.

Although the shape of the metal rods 1004 illustrated in FIGS. 10A-10C is described as flared, it should be understood that any non-linear shape for metal rods 1004 included in the insulator layer 1002 can be used to obtain a similar effect of directing electric field lines to produce a desired measurement profile. In some examples, the metal rods 1004 can be linear but angled relative to the normal direction of the top surface 1006 and bottom surface 1008 of the insulator layer 1002 (e.g., a line through a respective linear metal rod intersects the top surface 1006 and bottom surface 1008 at different x, y coordinates). It should also be understood that the metal rods do not necessarily have to have a uniform cross-section through the thickness of the insulator layer 1002. For example, the metal rods 1004 could have different diameters at opposing ends of the rod. In addition, as explained above with regard to FIGS. 4B and 8B the metal rods do not have to be cylindrical in shape. The shape of the metal rods 1004 (including a cross-sectional shape of the rods) could be any shape and does not necessarily need to remain consistent throughout the entire thickness of the insulator layer 1006.

Figure 11:
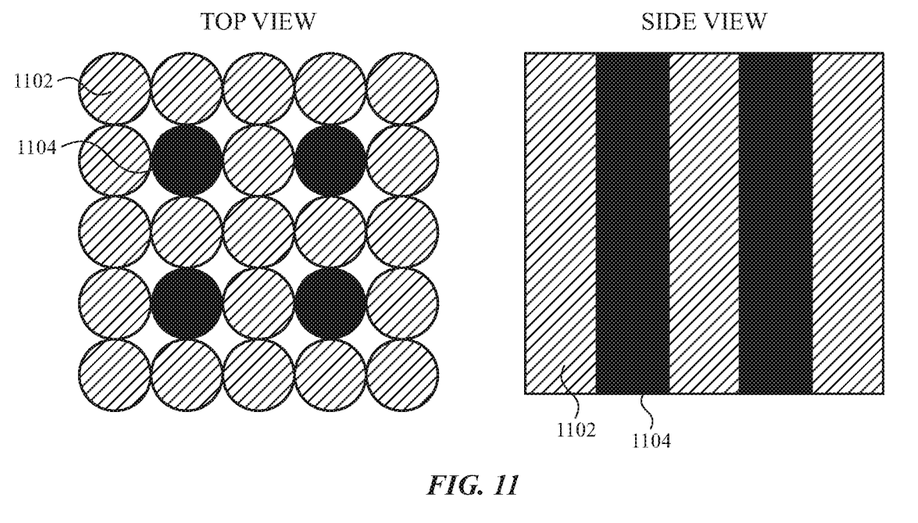
FIG. 11 illustrates an exemplary insulator layer with embedded metallic components constructed of bundled fibers according to examples of the disclosure

FIG. 11 illustrates an exemplary insulator layer with embedded metal rods constructed of bundled fibers according to examples of the disclosure. FIG. 11 includes a top view showing bundles of fiber made of an insulator material 1102 with conductive fibers 1104 interspersed between the insulator fibers. The illustrated pattern includes one fiber made of insulator 1102 positioned between each conductive fiber 1104 in both the vertical and horizontal directions. A cross-sectional view through one row of bundled fibers in the pattern of FIG. 11 for is also shown for further illustration. It should be understood that the cross-section shown is for one of the rows that includes both fibers made of insulator material 1102 and conductive fibers 1104. In some examples, center-to-center spacing between the conductive fibers can easily be varied by changing the spacing between each adjacent fiber in the horizontal and vertical directions. In some examples, a transparent epoxy can be used to bind together the fibers made of insulator material 1102 and the conductive fibers 1104.

Figure 12:
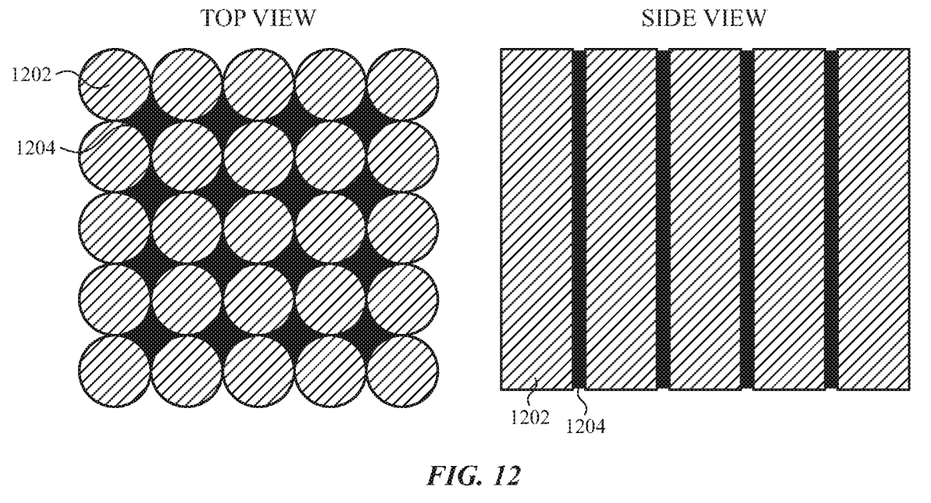
FIG. 12 illustrates another exemplary insulator layer with embedded metallic components constructed of bundled fibers according to examples of the disclosure.

FIG. 12 illustrates another exemplary insulator layer with embedded metallic components (e.g., metal rods) constructed of bundled fibers according to examples of the disclosure. In the example of FIG. 12, all of the bundled fibers can be fibers made of an insulator material 1202. The conductive rods 1204 for the construction in FIG. 12 can be formed by injecting a conductive epoxy 1204 or other suitable material that serves the tunnel function of a metal rod as described in this disclosure as well as holding together the bundled fibers made of an insulator material 1202. As can be seen from the top view of the bundled fibers, the conductive rods 1204 made of epoxy can have a shape that is not cylindrical as has been previously described in the present disclosure. In some examples, a conductive layer (e.g., corresponding to conductive layer 454) can be filled with an insulator material (e.g., injected non-conductive epoxy).

Therefore, according to the above, some examples of the disclosure are directed to a touch sensor panel having a touch sensitive surface comprising: a first electrode layer comprising a plurality of electrodes, an insulator layer positioned between the first electrode layer and the touch sensitive surface, the insulator layer having a first thickness between a first surface and a second surface opposing the first surface, and a plurality of conductive rods (e.g., metal rods) distributed within the insulator layer, and extending at least partially through the first thickness. Additionally or alternatively, in some examples, the plurality of conductive rods distributed within the insulator comprises straight rods having a uniform distribution and uniform physical dimensions. Additionally or alternatively, in some examples, the metal rods are distributed with a first density at the first surface of the insulator layer near respective electrodes of the plurality of electrodes and a second density, different from the first density, at the second surface of the insulator layer. Additionally or alternatively, in some examples, the metal rods have a flared shape. Additionally or alternatively, in some examples, the metal rods have a straight shape and the metal rods pass through the insulator layer at an angle relative to the normal of the first surface or the second surface. Additionally or alternatively, in some examples, the plurality of conductive rods are distributed with a first coupling strength in a first region, and a second coupling strength, lower than the first coupling strength, in a second region. Additionally or alternatively, in some examples, the second coupling strength being lower than the first coupling strength corresponds to a first rod density of the plurality of conductive rods in the second region and a second rod density, lower than the first rod density, in the second region. Additionally or alternatively, in some examples, the second coupling strength being lower than the first coupling strength corresponds to a first rod diameter of the plurality of conductive rods in the first region and a second diameter, lower than the first rod diameter, of the plurality of conductive rods in the second region. Additionally or alternatively, in some examples, the second coupling strength being lower than the first coupling strength corresponds to a first rod volume of the plurality of conductive rods in the first region and a second rod volume, lower than the first rod volume, of the plurality of conductive rods in the second region. Additionally or alternatively, in some examples, the plurality of electrodes are configured to operate in a mutual capacitance sensing mode, the plurality of conductive rods are distributed with a first coupling strength in a plurality of border regions of the plurality of electrodes, wherein each border region comprises a region proximate to a drive electrode and a sense electrode adjacent to the drive electrode, and the plurality of conductive rods are distributed with a second coupling strength, lower than the first coupling, in a second region outside of the plurality of border regions. Additionally or alternatively, in some examples, the second coupling strength being lower than the first coupling strength corresponds to a first rod density of the plurality of conductive rods in the second region and a second rod density, greater than the first rod density, in the plurality of border regions. Additionally or alternatively, in some examples, the second coupling strength being lower than the first coupling strength corresponds to a first rod diameter of the plurality of conductive rods in the second region and a second diameter, greater than the first rod diameter, of the plurality of conductive rods in the plurality of border regions. Additionally or alternatively, in some examples, the second coupling strength being lower than the first coupling strength corresponds to a first rod volume of the plurality of conductive rods in the second region and a second rod volume, greater than the first rod volume, of the plurality of conductive rods in the plurality of border regions. Additionally or alternatively, in some examples, the plurality of electrodes are configured to operate in a mutual capacitance sensing mode, the plurality of conductive rods are distributed with a first density in a plurality of border regions of the plurality of electrodes, wherein each border region comprises a region proximate to a drive electrode and a sense electrode adjacent to the drive electrode, and the plurality of conductive rods are distributed with a second density, lower than the first density, in a second region outside of the plurality of border regions. Additionally or alternatively, in some examples, the insulator layer comprises a plurality of transparent non-conductive bundled fibers and a plurality of conductive bundled fibers, wherein the conductive bundled fibers are distributed evenly among the transparent non-conductive bundled fibers. Additionally or alternatively, in some examples, the insulator layer comprises a plurality of transparent non-conductive bundled fibers and the plurality of conductive rods distributed within the insulator layer comprise a conductive epoxy that binds together the non-conductive bundled fibers. Additionally or alternatively, in some examples, the at least one touch sensor electrode layer comprising the plurality of electrodes is disposed directly on the first surface of the insulator layer. Additionally or alternatively, in some examples, the touch sensor panel further comprises a cover substrate coupled to second surface of the insulator by an adhesive layer. Additionally or alternatively, in some examples, the touch sensor panel further comprises a display layer coupled to the first surface of the insulator layer. Additionally or alternatively, in some examples, the at least one touch sensor layer is disposed directly on the display layer.

Some examples of the disclosure are directed to a touch sensor panel. The touch sensor panel can comprise: a touch sensitive surface; an electrode layer comprising touch electrodes; and an intermediate layer positioned between the electrode layer and the touch sensitive surface. The intermediate layer can have a thickness between a first surface and a second surface, opposite the first surface. The intermediate layer can comprise conductive components and insulative components. The conductive components can extend at least partially through the thickness of the intermediate layer. Additionally or alternatively, in some examples, the intermediate layer can comprise an insulator layer and the conductive components comprise conductive rods distributed within the insulator layer. Additionally or alternatively, in some examples, the conductive rods distributed within the insulator can comprise rods oriented normal to the first surface or the second surface having a uniform distribution and uniform physical dimensions. Additionally or alternatively, in some examples, the conductive rods can be distributed with a first density at the first surface of the insulator layer near respective touch electrodes and with a second density, different from the first density, at the second surface of the insulator layer. Additionally or alternatively, in some examples, the conductive rods can have a flared shape. Additionally or alternatively, in some examples, the conductive rods can have a linear shape and the conductive rods can pass through the insulator layer oriented at an angle relative to a normal of the first surface or the second surface (e.g., not perpendicular to the first surface or the second surface). Additionally or alternatively, in some examples, the conductive rods can be distributed with a first coupling strength in a first region, and a second coupling strength, lower than the first coupling strength, in a second region. Additionally or alternatively, in some examples, the second coupling strength being lower than the first coupling strength can correspond to a first rod density of the conductive rods in the first region and a second rod density, lower than the first rod density, in the second region. Additionally or alternatively, in some examples, the second coupling strength being lower than the first coupling strength can correspond to a first rod diameter of the conductive rods in the first region and a second diameter, lower than the first rod diameter, of the conductive rods in the second region. Additionally or alternatively, in some examples, the second coupling strength being lower than the first coupling strength can correspond to a first rod volume of the conductive rods in the first region and a second rod volume, lower than the first rod volume, of the conductive rods in the second region. Additionally or alternatively, in some examples, the touch electrodes can be configured to operate in a mutual capacitance sensing mode; the conductive rods can be distributed with a first coupling strength in boundary regions between touch electrodes (each boundary region can comprise a region proximate to a drive electrode of the touch electrodes and a sense electrode of the touch electrodes adjacent to the drive electrode); and the conductive rods can be distributed with a second coupling strength, lower than the first coupling, in a second region outside of the boundary regions. Additionally or alternatively, in some examples, the second coupling strength being lower than the first coupling strength can correspond to a first rod density of the conductive rods in the second region and a second rod density, greater than the first rod density, in the boundary regions. Additionally or alternatively, in some examples, the second coupling strength being lower than the first coupling strength can correspond to a first rod diameter of the conductive rods in the second region and a second diameter, greater than the first rod diameter, of the conductive rods in the boundary regions. Additionally or alternatively, in some examples, the second coupling strength being lower than the first coupling strength can correspond to a first rod volume of the conductive rods in the second region and a second rod volume, greater than the first rod volume, of the conductive rods in the boundary regions. Additionally or alternatively, in some examples, the touch electrodes can be configured to operate in a mutual capacitance sensing mode; the conductive rods can be distributed with a first density in boundary regions between touch electrodes (each boundary region can comprise a region proximate to a drive electrode of the touch electrodes and a sense electrode of the touch electrodes adjacent to the drive electrode); and the conductive rods can be distributed with a second density, lower than the first density, in a second region outside of the boundary regions. Additionally or alternatively, in some examples, the insulative components can comprise transparent non-conductive bundled fibers and the conductive components can comprise conductive bundled fibers. The conductive bundled fibers can be distributed evenly among the transparent non-conductive bundled fibers in the intermediate layer. Additionally or alternatively, in some examples, the insulative components can comprise transparent non-conductive bundled fibers and the conductive components can comprise conductive rods distributed within the intermediate layer formed from a conductive epoxy that binds together the non-conductive bundled fibers. Additionally or alternatively, in some examples, the electrode layer can be disposed directly on the first surface of the intermediate layer. Additionally or alternatively, in some examples, the touch sensitive surface can comprise a cover substrate coupled to second surface of the intermediate layer by an adhesive layer. Additionally or alternatively, in some examples, the touch sensor panel can further comprise a display layer coupled to the first surface of the intermediate layer (forming a touch screen).

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A touch sensor panel comprising:
   a touch sensitive surface;
   an electrode layer comprising touch electrodes; and
   an intermediate layer positioned between the electrode layer and the touch sensitive surface, the intermediate layer having a thickness between a first surface and a second surface, opposite the first surface, wherein the intermediate layer comprises conductive components and insulative components, the conductive components extending at least partially through the thickness of the intermediate layer;
   wherein, for a first touch electrode of the touch electrodes, a first plurality of the conductive components extend at least partially through the thickness of the intermediate layer in a region over the first touch electrode.
2. The touch sensor panel of claim 1, wherein the intermediate layer comprises an insulator layer and the conductive components comprise conductive rods distributed within the insulator layer.
3. The touch sensor panel of claim 2, wherein the conductive rods distributed within the insulator comprises rods oriented normal to the first surface or the second surface having a uniform distribution and uniform physical dimensions.
4. The touch sensor panel of claim 2, wherein the conductive rods are distributed with a first density at the first surface of the insulator layer near respective touch electrodes and with a second density, different from the first density, at the second surface of the insulator layer.
5. The touch sensor panel of claim 4, wherein the conductive rods have a flared shape.
6. The touch sensor panel of claim 4, wherein the conductive rods have a linear shape and the conductive rods pass through the insulator layer oriented at an angle relative to a normal of the first surface or the second surface.
7. The touch sensor panel of claim 2, wherein the conductive rods are distributed with a first coupling strength in a first region, and a second coupling strength, lower than the first coupling strength, in a second region.
8. The touch sensor panel of claim 7, wherein the second coupling strength being lower than the first coupling strength corresponds to a first rod density of the conductive rods in the first region and a second rod density, lower than the first rod density, in the second region.
9. The touch sensor panel of claim 7, wherein the second coupling strength being lower than the first coupling strength corresponds to a first rod diameter of the conductive rods in the first region and a second diameter, lower than the first rod diameter, of the conductive rods in the second region.
10. The touch sensor panel of claim 7, wherein the second coupling strength being lower than the first coupling strength corresponds to a first rod volume of the conductive rods in the first region and a second rod volume, lower than the first rod volume, of the conductive rods in the second region.
11. The touch sensor panel of claim 2, wherein:
    the touch electrodes are configured to operate in a mutual capacitance sensing mode;
    the conductive rods are distributed with a first density in boundary regions between touch electrodes, wherein each boundary region comprises a region proximate to a drive electrode of the touch electrodes and a sense electrode of the touch electrodes adjacent to the drive electrode; and
    the conductive rods are distributed with a second density, lower than the first density, in a second region outside of the boundary regions.
12. The touch sensor panel of claim 2, wherein:
    the touch electrodes are configured to operate in a mutual capacitance sensing mode;
    the conductive rods are distributed with a first coupling strength in boundary regions between touch electrodes, wherein each boundary region comprises a region proximate to a drive electrode of the touch electrodes and a sense electrode of the touch electrodes adjacent to the drive electrode; and
    the conductive rods are distributed with a second coupling strength, lower than the first coupling, in a second region outside of the boundary regions.
13. The touch sensor panel of claim 12, wherein the second coupling strength being lower than the first coupling strength corresponds to a first rod density of the conductive rods in the second region and a second rod density, greater than the first rod density, in the boundary regions.

14. The touch sensor panel of claim 12, wherein the second coupling strength being lower than the first coupling strength corresponds to a first rod diameter of the conductive rods in the second region and a second diameter, greater than the first rod diameter, of the conductive rods in the boundary regions.

15. The touch sensor panel of claim 12, wherein the second coupling strength being lower than the first coupling strength corresponds to a first rod volume of the conductive rods in the second region and a second rod volume, greater than the first rod volume, of the conductive rods in the boundary regions.

16. The touch sensor panel of claim 1, wherein the insulative components comprise transparent non-conductive bundled fibers and the conductive components comprise conductive bundled fibers, wherein the conductive bundled fibers are distributed evenly among the transparent non-conductive bundled fibers in the intermediate layer.

17. The touch sensor panel of claim 1, wherein the insulative components comprise transparent non-conductive bundled fibers and the conductive components comprise conductive rods distributed within the intermediate layer formed from a conductive epoxy that binds together the non-conductive bundled fibers.

18. The touch sensor panel of claim 1, wherein the electrode layer is disposed directly on the first surface of the intermediate layer.

19. The touch sensor panel of claim 1, wherein the touch sensitive surface comprising a cover substrate coupled to second surface of the intermediate layer by an adhesive layer.

20. The touch sensor panel of claim 1, further comprising:
a display layer coupled to the first surface of the intermediate layer.

21. The touch sensor panel of claim 1, wherein the conductive components are physically separated from one another by the insulative components in the intermediate layer.

22. The touch sensor panel of claim 1, wherein the conductive components extend from the first surface to the second surface through the thickness of the intermediate layer.

\* \* \* \* \*